United States Patent
Lee

(10) Patent No.: US 10,015,862 B1
(45) Date of Patent: Jul. 3, 2018

(54) POWER SUPPLY APPARATUS AND METHOD OF SUPPLYING POWER

(71) Applicant: EZEX CORPORATION, Seongnam-si (KR)

(72) Inventor: Kyung Sup Lee, Gwacheon-si (KR)

(73) Assignee: EZEX CORPORATION, Seongnam-si (KR)

( * ) Notice: Subject to any disclaimer, the term of this patent is extended or adjusted under 35 U.S.C. 154(b) by 0 days.

(21) Appl. No.: 15/457,052

(22) Filed: Mar. 13, 2017

(30) Foreign Application Priority Data

Feb. 14, 2017 (KR) .................... 10-2017-0019950

(51) Int. Cl.
  *H05B 37/02* (2006.01)
(52) U.S. Cl.
  CPC .................. *H05B 37/0209* (2013.01)
(58) Field of Classification Search
  CPC  H05B 33/0815; H05B 33/0845; H05B 37/02; H05B 33/0818; H05B 37/0272; H05B 39/04; H05B 33/0848
  USPC ......... 315/224, 200 R, 307, 209 R, 246, 309
  See application file for complete search history.

(56) References Cited

U.S. PATENT DOCUMENTS

| | | | | |
|---|---|---|---|---|
| 2011/0057568 A1* | 3/2011 | Tsai | ...................... | H02M 5/293 315/121 |
| 2011/0115412 A1* | 5/2011 | Welten | ............... | H05B 33/0815 315/307 |
| 2011/0254525 A1* | 10/2011 | Gaknoki | ............ | H05B 33/0815 323/283 |
| 2013/0057180 A1* | 3/2013 | Datta | ................. | H05B 33/0845 315/307 |
| 2015/0108911 A1 | 4/2015 | Lim | | |

FOREIGN PATENT DOCUMENTS

| KR | 20120065499 | 6/2012 |
|---|---|---|
| KR | 20130000622 | 1/2013 |
| KR | 20150051080 | 5/2015 |
| KR | 20160067705 | 6/2016 |

* cited by examiner

*Primary Examiner* — Wei Chan
(74) *Attorney, Agent, or Firm* — Cantor Colburn LLP

(57) ABSTRACT

A power supply apparatus includes: a main switch element connected to a terminal of a lamp and configured to perform a switching operation; an AC to DC converter configured to an AC to DC converter configured to generate DC power by using a signal of an AC hot line and a signal of the terminal of the lamp; a comparator configured to compare a comparison input signal with a predetermined first reference voltage; and a control signal generator configured to generate a control signal for controlling an operation of the main switch element by using an output signal from the comparator.

9 Claims, 4 Drawing Sheets

POWER SUPPLY APPARATUS AND METHOD OF SUPPLYING POWER

CROSS REFERENCE TO RELATED APPLICATION

The present application claims priority to Korean Patent Application No. 10-2017-0019950, filed Feb. 14, 2017, the entire contents of which is incorporated herein for all purposes by this reference.

BACKGROUND OF THE INVENTION

Field of the Invention

The present invention relates generally to a power supply apparatus and a method of supplying power. More particularly, the present invention relates to a power supply apparatus and a method of supplying power, whereby it is possible to supply power for a wireless switch controller by generating DC power using a power supply line of a switch for a lamp both when the lamp is on and when the lamp is off.

Description of the Related Art

Generally, a lamp may be controlled by using a wireless switch controller, namely an RF switch controller.

However, for user convenience, it is required to supply a power supply voltage to the RF switch controller without an additional battery in RF switch controller. However, as described in the [Description of the Related Art] in the document of Korean Patent No. 10-1015649 (RF switch controller power supply apparatus, hereinafter 'related art'), when the lamp is on, proper AC power cannot be supplied, so countermeasures are required.

In the related art, when the lamp is off, a second rectifying portion 131 and an AC to DC converter 132 are used, and when the lamp is on, a current booster 121 and a first rectifying portion 122 are used. In other words, two paths are required, whereby the configuration of the circuit becomes complicated.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a power supply apparatus and a method of supplying power, in which DC power is generated by using AC power that is input into a lamp through the same path regardless of whether the lamp is on or off.

In order to achieve the above object, according to some aspect of the present invention, there is provided a power supply apparatus, which is operated by receiving an AC signal, the power supply apparatus including: a main switch element connected to a terminal of a lamp and configured to perform a switching operation; an AC to DC converter configured to generate DC power by using a signal of an AC hot line and a signal of the terminal of the lamp; a comparator configured to compare a comparison input signal with a predetermined first reference voltage; and a control signal generator configured to generate a control signal for controlling an operation of the main switch element by using an output signal from the comparator, wherein the comparison input signal is either the signal of the terminal of the lamp or a signal based on the signal of the terminal of the lamp.

To be more specific, it is preferred that the control signal generator generates the control signal by using a signal that extends a time section, where the output signal of the comparator is activated, to after a phase of the AC signal changes, wherein when the lamp is on, the control signal turns off the main switch element until the output signal of the comparator is activated.

Further, the control signal may be a signal that is output from a third switch element after the signal, which extends the time section where the output signal of the comparator is activated to after the phase of the AC signal changes, is input into the third switch element.

Further, it is preferred that the control signal generator includes: a first switch element configured to perform a switching operation by using the output signal of the comparator; a second switch element configured to perform a switching operation by using an output signal of the first switch element; and a second capacitor connected to an output terminal of the first switch element. Further, the control signal generator may use a first signal as a power signal, wherein the first signal is input into one of a drain terminal and a source terminal of the first switch element via a first circuit and a third circuit. Further, it is preferred that a second circuit for overvoltage protection is provided between the first circuit and the other of the drain terminal and the source terminal of the first switch element.

Further, the control signal generator may further include a third switch element configured to perform a switching operation by using an output signal of the second switch element, wherein the control signal is an output signal of the third switch element.

In order to achieve the above object, according to some aspect of the present invention, there is provided a power supply apparatus.

The power supply apparatus, in which an AC signal supplied by two signal lines, namely a first AC line and a second AC line, is used, includes: a main switch element connected to a terminal of a lamp and configured to perform a switching operation; an AC to DC converter configured to generate DC power by using an a signal of the first AC line and a signal of the terminal of the lamp; and a control signal generator configured to use a first signal as a power supply voltage, and generate a control signal for controlling an operation of the main switch element.

It is preferred that when the lamp is on, the control signal turns off the main switch element for a predetermined time from either a first point, which is a zero-crossing point from a positive phase to a negative phase of the AC signal, or a second point, which is a zero-crossing point from a negative phase to a positive phase of the AC signal.

Further, the control signal generator may generate the control signal by using a setting signal, wherein the setting signal is activated after one of the first point and the second point, and is inactivated after the other of the first point and the second point. Further, the control signal may be a signal that is output from the third switch element after the setting signal is input into a third switch element.

Further, the power supply apparatus of the present invention may further include a comparator configured to compare a comparison input signal with a first reference voltage, wherein the comparison input signal is either the signal of the terminal of the lamp or a signal based on the signal of the terminal of the lamp. Further, it is preferred that the control signal generator activates the setting signal by using an output signal of the comparator.

In order to achieve the above object, according to some aspects of the present invention, there is provided a method of supplying power, in which an AC signal supplied by two signal lines, namely a first AC line and a second AC line, including: (a) generating DC power by using a signal of the first AC line signal and a signal of a terminal of a lamp; and (b) generating a control signal for controlling an operation of a main switch element connected to the terminal of the lamp.

Further, it is preferred that when the lamp is on, the control signal turns off the main switch element for a predetermined time from either a first point, which is a zero-crossing point from a positive phase to a negative phase of the AC signal, or a second point, which is a zero-crossing point from a negative phase to a positive phase of the AC signal.

Further, the step of (b) may generate the control signal by using a setting signal, wherein the setting signal is activated after one of the first point and the second point, and is inactivated after a remaining one of the first point and the second point.

Preferably, the method of supplying power of the present invention further includes comparing a comparison input signal with a predetermined first reference voltage before the step (b), wherein the comparison input signal is either a signal of the terminal of the lamp or a signal based on the signal of the terminal of the lamp. Further, the step (b) may activate the setting signal by using an output signal in the comparing the comparison input signal.

According to the power supply apparatus and the method of supplying power of the present invention, it is possible to generate DC power by using AC power that is input into a lamp through the same path regardless of whether the lamp is on or off.

BRIEF DESCRIPTION OF THE DRAWINGS

The above and other objects, features and other advantages of the present invention will be more clearly understood from the following detailed description when taken in conjunction with the accompanying drawings, in which:

FIG. 3 is a diagram showing voltage waveforms at main nodes of the present invention when a lamp is on.

DETAILED DESCRIPTION OF THE INVENTION

Figure 1:
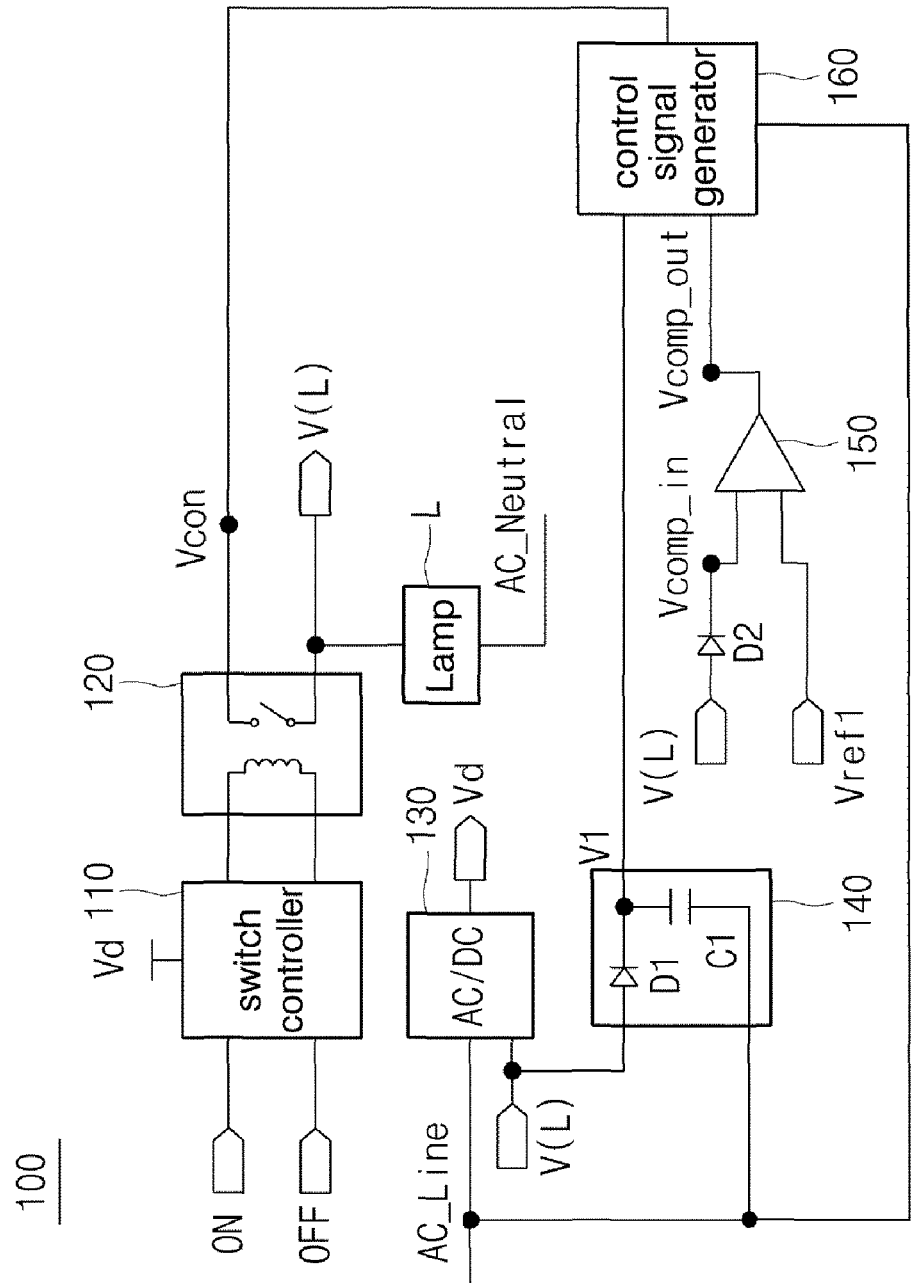
FIG. 1 is a diagram showing a power supply apparatus according to an embodiment of the present invention.

Hereinbelow, an exemplary embodiment of the present invention will be described in detail with reference to the accompanying drawings. Throughout the drawings, the same reference numerals will refer to the same or like parts.

It is to be understood that the following description is not intended to limit the present invention to the exemplary embodiment and that various changes and modifications may be made in the invention without departing from the spirit and scope thereof.

A power supply apparatus of the present invention is configured to ultimately generate DC power by using an AC signal supplied by two signal lines, namely a first AC line and a second AC line. In the following description, the first AC line is referred to as an AC hot line, and the second AC line is referred to as an AC neutral line, but it is alternatively possible to refer to the first AC line as the AC neutral line, and to refer to the second AC line as the AC hot line.

Firstly, FIG. 1 is a diagram showing a power supply apparatus 100 according to an embodiment of the present invention.

As shown in FIG. 1, the power supply apparatus 100 according to the embodiment of the present invention includes: a switch controller 110; a main switch element 120; an AC to DC converter 130; an internal power generator 140; a comparator 150; and a control signal generator 160.

The switch controller 110 generates a lamp control signal to turn on or off a lamp L by turning on or off the main switch element 120 in response to a signal for turning on or off the lamp L, which is input from the outside, such as from an RF switch controller. Herein, in some cases, the switch controller 110 may not be provided.

The main switch element 120 is operated by receiving the lamp control signal for controlling the on or off operation of the lamp L. In other words, the main switch element 120 is connected to one terminal of the lamp L to perform a switching operation. When a relay is used as the main switch element 120, the lamp control signal is input into one terminal of the relay, and the other terminal of the relay, between the one terminal and with which a coil is connected, may be connected to an earth ground. Of course, other than the relay, various switches may be used as the main switch element 120.

Thereby, when the lamp control signal is input to turn off the lamp L, the main switch element 120 is turned off, and a voltage of the one terminal of the lamp L is the same as the AC neutral signal, whereby the AC hot line signal V AC_Line and the voltage of the one terminal of the lamp L take on opposite phases. Accordingly, when the lamp L is off, the AC to DC converter 130 can generate DC power Vd by using the AC hot line signal V(AC_Line) and the voltage V(L) of the one terminal of the lamp L.

Thereby, when the lamp control signal is input to turn on the lamp L, basically, the main switch element 120 is turned on, and the AC hot line signal V(AC_Line) is transmitted to the one terminal of the lamp L, whereby the AC hot line signal V(AC_Line) and the voltage V(L) of the one terminal of the lamp L have the same phase. Accordingly, when the lamp L is on, the AC to DC converter 130 cannot generate the DC power by using the AC hot line signal V(AC_Line) and the voltage V(L) of the one terminal of the lamp L. However, the present invention is characterized in that the main switch element 120 is kept off during a predetermined time section in which the lamp L is on, so that the AC to DC converter 130 can generate the DC power using a control signal Vcon. To achieve this, the control signal Vcon, which is input into a third terminal of the main switch element 120 when the lamp L is on, becomes a waveform in which the AC hot line signal V(AC_Line) is off during a predetermined time section. A fourth terminal of the main switch element 120 is connected to the one terminal of the lamp L and is affected by the control signal Vcon. When a switch between the third terminal and the fourth terminal of the main switch element 120 is on, the control signal Vcon, having been applied to the third terminal, is transmitted to the fourth terminal.

When the main switch element 120 is turned on, the control signal Vcon is transmitted to the one terminal of the lamp L to turn the lamp L on. The other terminal of the lamp L is connected to the AC neutral signal.

The AC to DC converter 130 serves to perform conversion into the DC power Vd by receiving the AC hot line signal V(AC_Line) and the signal of the one terminal of the lamp L. An output of the AC to DC converter 130 may be used as a power source for a device, such as an RF switch controller.

The internal power generator 140 serves to generate and supply a power supply voltage for electronic component elements with the DC power within the control signal generator 160.

To be more specific, the internal power generator 140 is configured such that the signal V(L) of the one terminal of the lamp L is connected to one terminal of a first diode D1 and the other terminal of the first diode D1 is connected to a one terminal of a first capacitor C1, thereby generating a first signal V1 output from the one terminal of the first capacitor C1. The first signal V1 is used as a power supply voltage for at least one element within the control signal generator 160. Further, a ground terminal of the element within the control signal generator 160 is connected to the AC hot line signal V(AC_Line), such that the AC hot line voltage V(AC_Line) takes on a ground potential. Since the first signal V1 uses the voltage of the one terminal of the lamp L, a voltage level is much higher when the lamp L is off than when the lamp L is on.

The comparator 150 compares a comparison input signal Vcomp_in with a predetermined first reference voltage Vref1. To be more specific, the comparator 150 determines whether the comparison input signal Vcomp_in is greater than the first reference voltage Vref1. Herein, the comparison input signal Vcomp_in refers to the signal V(L) of the one terminal of the lamp L or a signal based on the signal V(L) of the one terminal of the lamp L. To be more specific, it is preferred that the comparison input signal Vcomp_in uses the signal V(L) of the one terminal of the lamp L via a second diode D2. By the level of the first reference voltage Vref1, it is possible to set a time section where the main switch element 120 is off.

When the lamp L is on, the control signal Vcon may turn off the main switch element 120 for a predetermined time from either a first point, which is a zero-crossing point from a positive phase to a negative phase of the AC signal, or a second point, which is a zero-crossing point from a negative phase to a positive phase of the AC signal.

Further, the control signal generator 160 may generate a setting signal V2 that is activated after a predetermined time from one of the first point and the second point. Further, the control signal generator 160 activates the setting signal V2 using an output signal Vcomp_out of the comparator 150. The setting signal V2 becomes an input signal of a third switch element SW3. In other words, the setting signal V2 serves to extend the time section, where the output signal Vcomp_out of the comparator 150 is activated, to after the phase of the AC signal changes. The setting signal V2 is inactivated after the other one of the first point and the second point. Inactivation of the setting signal V2 may be set by charging using a second capacitor C2.

Hereinafter, reference will be made in detail to the operation of the control signal generator 160, with an example where the main switch element 120 is off for a predetermined time from the first point, which is a zero-crossing point from a positive phase to a negative phase of the AC signal.

The control signal generator 160 serves to extend the time section where the output signal of the comparator 150 is activated, which means that the first reference voltage Vref1 is greater than the comparison input signal Vcomp_in, to after the phase of the AC hot line signal V(AC_Line) changes. If the control signal generator 160 does not extend the time section where the output signal Vcomp_out of the comparator 150 is activated, which means that the comparison input signal Vcomp_in is greater than the first reference voltage Vref1, to after the phase of AC hot line signal V(AC_Line) changes, the main switch element 120 may be turned off again when the AC hot line signal V (AC_Line) is kept low.

The control signal generator 160 extends the time section where the output signal Vcomp_out of the comparator 150 is activated, which means that the comparison input signal Vcomp_in is greater than the first reference voltage Vref1, to after the phase of the AC hot line signal V(AC_Line) changes, whereby when the lamp L is on, the control signal Vcon may turn off the main switch element 120 only until the output signal Vcomp_out of the comparator 150 is activated, which means that the comparison input signal Vcomp_in is larger than the first reference voltage Vref1.

Figure 2:
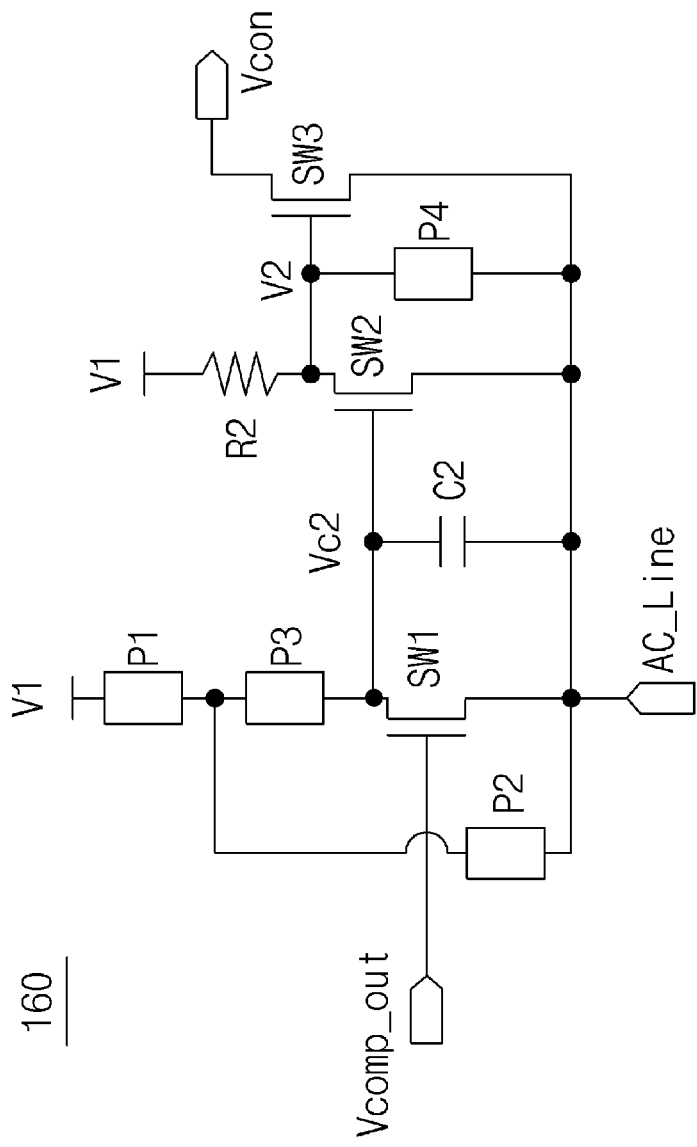
FIG. 2 is a diagram showing a control signal generator according to the embodiment of the present invention.

FIG. 2 is a diagram showing the control signal generator 160 according to the embodiment of the present invention.

As shown in FIG. 2, the control signal generator 160 of the present invention includes: a first switch element SW1, configured to perform a switching operation by using the output signal of the comparator 150; a second switch element SW2, configured to perform a switching operation by using an output signal of the first switch element; and a second capacitor C2, connected to an output Vc2 of the first switch element SW1. The control signal generator 160 further includes a third switch element SW3 configured to perform a switching operation by using an output signal V2 of the second switch element SW2. An input signal of the third switch element SW3 is the setting signal V2; an output signal of the third switch element SW3, which is the control signal Vcon, may be input into the third terminal of the main switch element 120.

The first switch element SW1, the second switch element SW2, and the third switch element SW3 may be implemented by using a field-effect transistor. In particular, it is preferable for the third switch element SW3 to use an n-channel field-effect transistor (N-channel FET).

Ground terminals of the first switch element SW1, the second switch element SW2, and the third switch element SW3 are connected to the AC hot line signal V(AC_Line); and the first signal V1 is applied to power supply voltages of the first switch element SW1 and the second switch element SW2.

To be more specific, the first signal V1 is input into one of a drain terminal and a source terminal of the first switch element SW1 via a first circuit P1 and a third circuit P3, thereby being used as a power supply voltage. Further, a second circuit P2 for overvoltage protection is provided between the first circuit P1 and the other one of the drain terminal and the source terminal of the first switch element. The first signal V1, which is input via the first circuit P1, is much higher when the lamp L is off than when the lamp L is on, and thereby charges the second capacitor C2 quickly, so it is impossible to extend the time section where the output signal Vcomp_out of the comparator 150 is activated, which means that the comparison input signal Vcomp_in is greater than the first reference voltage Vref1, to after the phase of the AC hot line signal V(AC_Line) changes, and the main switch element 120 may be turned off again when the AC hot line signal V (AC_Line) is kept low. To solve this problem, the third circuit P3 allows the second capacitor C2 to be charged slowly by lowering voltage.

It is preferred that a fourth circuit P4 for overvoltage protection be provided between a drain terminal and a source terminal of the third switch element SW3.

The first circuit P1 and the third circuit P3 may use a resistance element, and the second circuit P2 and the fourth circuit P4 may use a zener diode.

Figure 3:
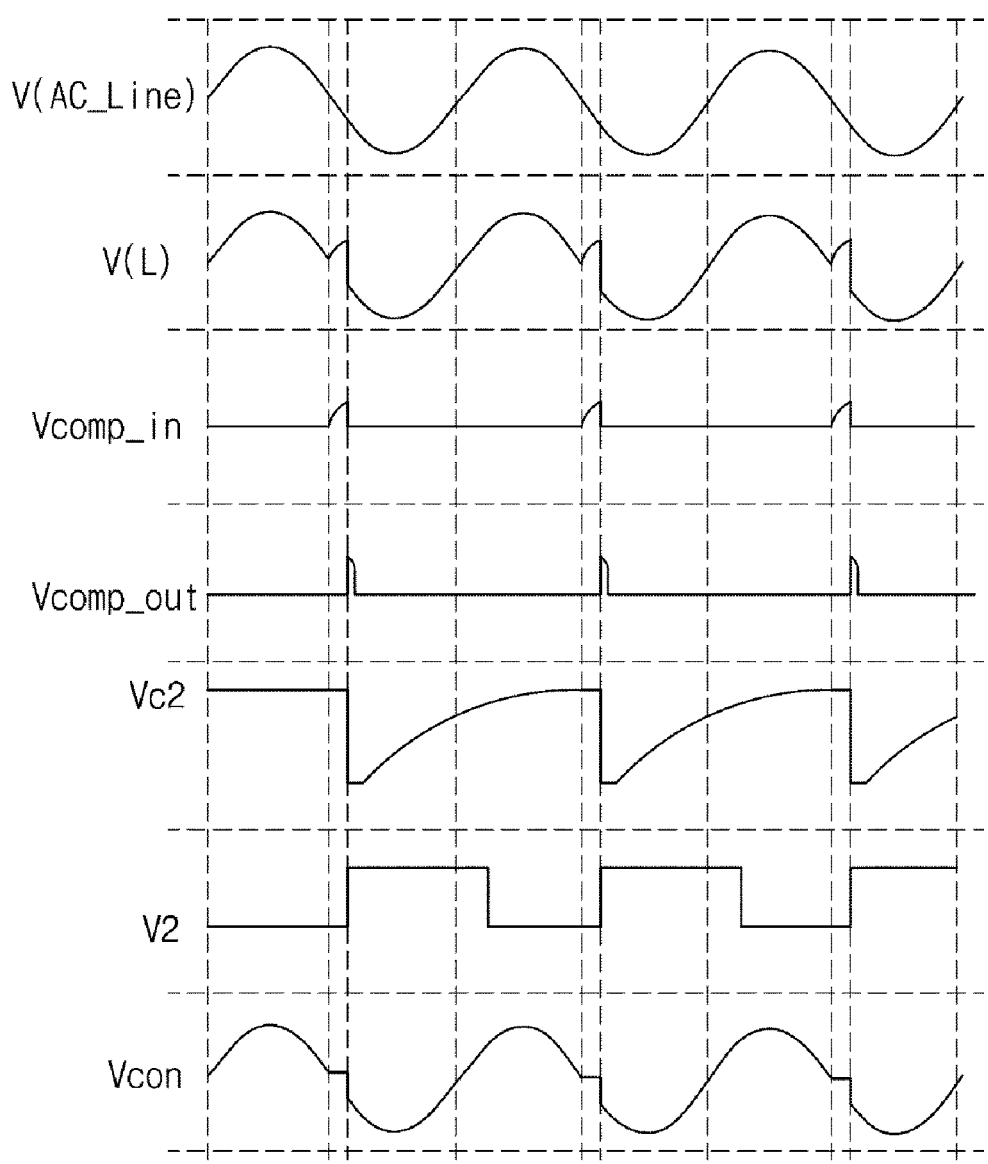
Figure 4:
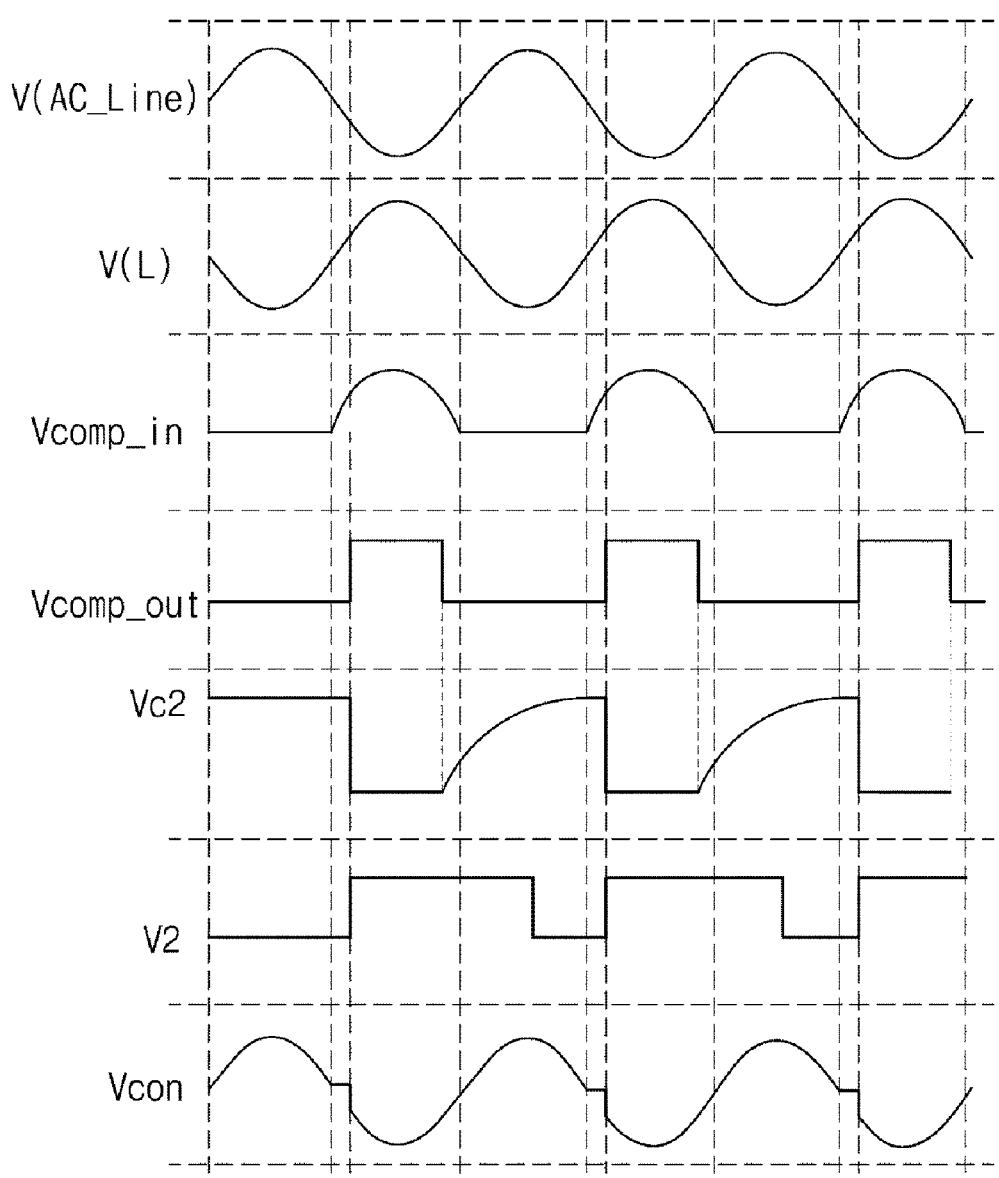
FIG. 4 is a diagram showing voltage waveforms at main nodes of the present invention when a lamp is off.

FIGS. 3 and 4 respectively show a diagram of voltage waveforms at main nodes of the present invention when the lamp is on and off.

However, in FIGS. 3 and 4, waveforms of signals, other than the AC hot line signal V(AC_Line), the output signal of the one terminal of the lamp L, and the control signal Vcon, show only the magnitude of voltage by calibrating the AC hot line voltage V(AC_Line) for description. In other words, actual waveforms of signals other than the AC hot line signal V(AC_Line), the output signal of the one terminal of the lamp L, and the control signal Vcon, are calculated by adding the AC hot line signal V(AC_Line) shown in the uppermost one of the FIGS. 3 and 4 to the waveforms shown in FIGS. 3 and 4.

For reference, as shown in FIGS. 1 and 2, the present invention performs control in a feedback manner. In other words, the present invention is configured such that the main switch element 120 is controlled by using the control signal Vcon, and the control signal Vcon is generated again by using the voltage V(L) of the one terminal of the lamp L as the output signal of the main switch element 120.

As shown in FIGS. 3 and 4, when the lamp L is on, the voltage V(L) of the one terminal of the lamp L is shown in a shape opposite to that of the AC hot line signal V(AC_Line) during a predetermined time section from the zero-crossing point, at which the phase of the AC hot line signal V(AC_Line) changes from a positive phase to a negative phase. In other words, during a time section where the voltage V(L) of the one terminal of the lamp L is shown in a shape opposite to that of the AC hot line signal V(AC_Line) within a predetermined time section from the zero-crossing point, at which the phase of the AC hot line signal V(AC_Line) changes from a positive phase to a negative phase, the control signal Vcon controls the main switch element 120 to be off. However, it may be possible that, during a time section where the voltage V(L) of the one terminal of the lamp L is shown in a shape opposite to that of the AC hot line signal V(AC_Line) within a predetermined time section from a zero-crossing point, at which the phase of the AC hot line signal V(AC_Line) changes from a negative phase to a positive phase, the control signal Vcon controls the main switch element 120 to be off.

Next, of the voltage V(L) of the one terminal of the lamp L, a positive voltage is input into the comparison input signal Vcomp_in of the comparator 150 via the second diode D2, and is output to the comparator 150.

Further, in the present invention, when the lamp L is on, the comparator 150 outputs a signal in the form of a very short pulse; and in contrast, when the lamp L is off, the comparator 150 outputs a signal in the form of a longer pulse.

Further, by maintaining the output signal of the comparator 150 for a predetermined time section via the second capacitor C2, it is possible to extend the time section where the output signal of the second switch element SW2 is maintained at a high level.

During the time section where the output signal of the second switch element SW2 is maintained at a high level, the third switch element SW3 is on, whereby the output signal of the third switch element SW3 becomes the same as the AC hot line signal V(AC_Line). In other words, during the time section where the output signal of the second switch element SW2 is maintained at a high level, the third switch element SW3 is off. However, since the AC hot line voltage V(AC_Line) is applied to the ground terminal of the third switch element SW3, during a time section where the AC hot line voltage V(AC_Line) has a positive phase, the output signal of the third switch element SW3 is the AC hot line voltage V (AC_Line) unchanged because of the internal diode constituting the third switch element SW3. However, when the third switch element SW3 is off during a time section where the AC hot line voltage V(AC_Line) has a negative phase, a signal is not output from the third switch element SW3 during that time section.

During the time section where the AC hot line voltage V(AC_Line) has a negative phase, a voltage during the time section where the third switch element SW3 is off is input into the third terminal of the main switch element 120, whereby, during the time section where the third switch element SW3 is off while the AC hot line voltage V(AC_Line) has a negative phase, the main switch element 120 is off.

When the lamp L is off, the main switch element 120 is always off, whereby the AC to DC converter 130 can always receive a voltage. However, when the lamp L is on, the control signal Vcon turns off the main switch element 120 using a signal during a predetermined time section from the zero-crossing point where the phase of the AC hot line signal V(AC_Line) changes from a positive phase to a negative phase, whereby the AC to DC converter 130 receives a voltage for generating the DC power.

As described above, the power supply apparatus 100 of the present invention is capable of generating the DC power stably using a switch side power supply line both when the lamp L is on and when off. Of course, the generated DC power may be supplied to a power of a wireless switch controller that generates the control signal Vcon to control the lamp L wirelessly.

Hereinbelow, reference will be made to a method of supplying power according to an embodiment of the present invention.

Since the method of supplying power according to an embodiment of the present invention uses the above described power supply apparatus 100 according to an embodiment of the present invention, it is understood that the method of supplying power includes the characteristics of the power supply apparatus 100.

The method of supplying power of the present invention generates DC power signal by using AC signals supplied from two signal lines, i.e. a first AC line and a second AC line.

The method of supplying power of the present invention includes: a conversion step of receiving a signal from between the first AC line and the one terminal of the lamp L and converting the same into the DC power (S10); a comparison step of comparing the comparison input signal Vcomp_in with the predetermined first reference voltage Vref1 (S20); and a generation step of generating the control signal Vcon for controlling the operation of the main switch element 120, which is connected to the one terminal of the lamp L (S30).

The comparison input signal Vcomp_in is the signal at the one terminal of the lamp L or a signal based on the signal at the one terminal of the lamp L.

When the lamp L is on, the control signal Vcon may turn off the main switch element 120 for a predetermined time from either a first point, which is a zero-crossing point where the phase of the AC signal changes from a positive phase to a negative phase, or a second point, which is a zero-crossing point where the phase of the AC signal changes from a negative phase to a positive phase.

Further, in the step S30, it is preferred that the control signal Vcon be generated using the setting signal V2. The setting signal V2 is activated after a predetermined time from one of the first point or the second point, and is inactivated after the other one of the first point and the second point.

Further, the setting signal V2 may be activated by using an output signal of the step S20.

As described above, according to the power supply apparatus 100 and the method of supplying power of the present invention, the DC power is generated by using the AC power that is input into the lamp L through the same path regardless of whether the lamp L is on or off.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A power supply apparatus comprising:
a main switch element connected to a terminal of a lamp and configured to perform a switching operation;
an AC to DC converter configured to generate DC power by using a signal of an AC hot line and a signal of the terminal of the lamp;
a comparator configured to compare a comparison input signal with a predetermined first reference voltage; and
a control signal generator configured to generate a control signal for controlling an operation of the main switch element by using an output signal from the comparator,
wherein the comparison input signal is either the signal of the terminal of the lamp or a signal based on the signal of the terminal of the lamp,
wherein the control signal generator generates the control signal by using a signal that extends a time section, where the output signal of the comparator is activated, to after a phase of the AC signal changes,
wherein when the lamp is on, the control signal turns off the main switch element until the output signal of the comparator is activated, and
wherein the control signal generator includes: a first switch element configured to perform a switching operation by using the output signal of the comparator; a second switch element configured to perform a switching operation by using an output signal of the first switch element; and a second capacitor connected to an output terminal of the first switch element.

2. The power supply apparatus of claim 1, wherein the control signal is a signal that is output from a third switch element after the signal, which extends the time section where the output signal of the comparator is activated to after the phase of the AC signal changes, is input into the third switch element.

3. The power supply apparatus of claim 1, wherein the control signal generator uses a first signal as a power signal,
wherein the first signal is input into one of a drain terminal and a source terminal of the first switch element via a first circuit and a third circuit.

4. The power supply apparatus of claim 3, wherein a second circuit for overvoltage protection is provided between the first circuit and the other of the drain terminal and the source terminal of the first switch element.

5. The power supply apparatus of claim 1, wherein the control signal generator further includes a third switch element configured to perform a switching operation by using an output signal of the second switch element,
wherein the control signal is an output signal of the third switch element.

6. A power supply apparatus comprising:
a main switch element connected to a terminal of a lamp and configured to perform a switching operation;
an AC to DC converter configured to generate DC power by using a signal of a first AC line and a signal of the terminal of the lamp;
a comparator configured to compare a comparison input signal with a first reference voltage, and
a control signal generator configured to generate a control signal for controlling an operation of the main switch element by using a first signal as a power supply voltage,
wherein when the lamp is on, the control signal turns off the main switch element for a predetermined time from either a first point, which is a zero-crossing point from a positive phase to a negative phase of the AC signal, or a second point, which is a zero-crossing point from a negative phase to a positive phase of the AC signal,
wherein the control signal generator generates the control signal by using a setting signal,
wherein the setting signal is activated after one of the first point and the second point, and is inactivated after a the other of the first point and the second point,
wherein the comparison input signal is either a signal of the terminal of the lamp or a signal based on the signal of the terminal of the lamp, and the control signal generator activates the setting signal by using an output signal of the comparator, and
wherein the control signal generator includes: a first switch element configured to perform a switching operation by using the output signal of the comparator; a second switch element configured to perform a switching operation by using an output signal of the first switch element and a second capacitor connected to an output terminal of the first switch element.

7. The power supply apparatus of claim 6, wherein the control signal is a signal that is output from a third switch element after the setting signal is input into the third switch element.

8. The power supply apparatus of claim 6, wherein the first signal is input into one of a drain terminal and a source terminal of the first switch element via a first circuit and a third circuit.

9. The power supply apparatus of claim 8, wherein the control signal generator further includes a third switch element configured to perform a switching operation by using an output signal of the second switch,
wherein an output signal of the third switch element is input into a terminal of the main switch element.

* * * * *